Aug. 10, 1926.

W. MILLSOM 1,595,909

CUTTING-OFF MECHANISM FOR LATHES AND LIKE MACHINE TOOLS

Filed Dec. 1, 1925    2 Sheets-Sheet 1

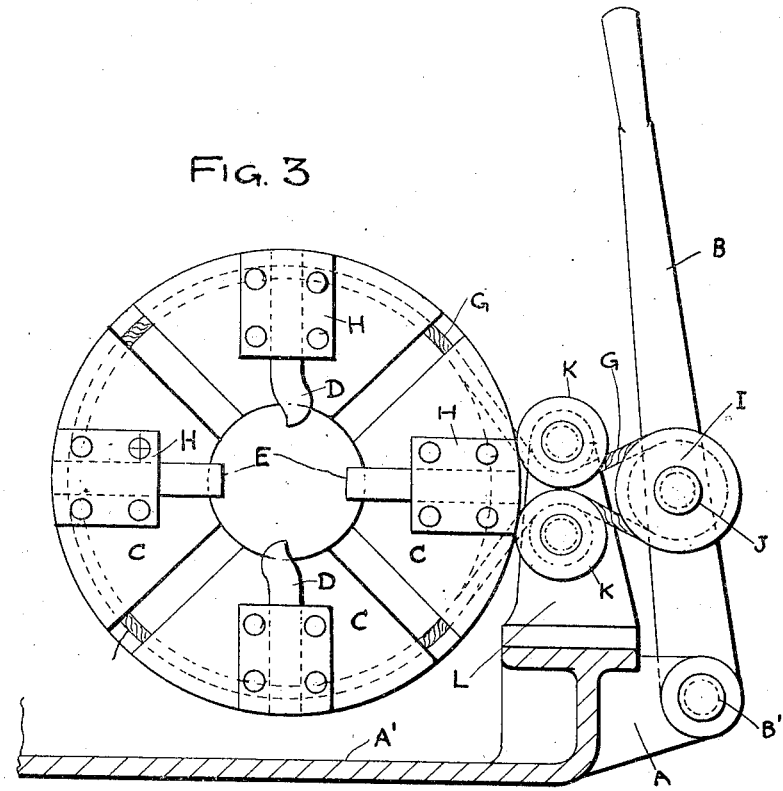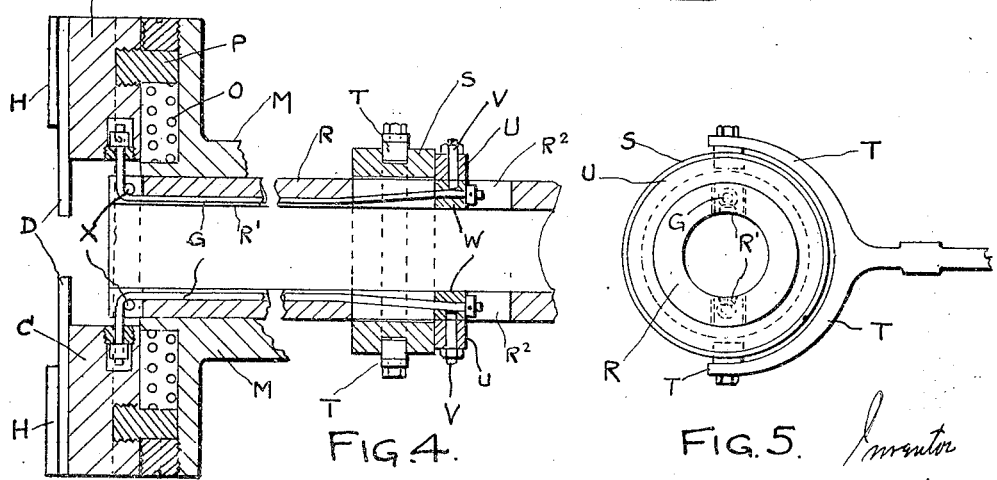

Patented Aug. 10, 1926.

1,595,909

UNITED STATES PATENT OFFICE.

WILLIAM MILLSOM, OF GLASGOW, SCOTLAND.

CUTTING-OFF MECHANISM FOR LATHES AND LIKE MACHINE TOOLS.

Application filed December 1, 1925, Serial No. 72,568, and in Great Britain November 29, 1924.

My invention relates to improvements in and relating to cutting off mechanism for lathes and like tools, and has for its object cheapness in construction with vast production.

In carrying out this invention, I provide a suitably shaped bracket which is suitably attached to the table of machine, or the table of the turning lathe or other such machine. Suitably pivoted to the bracket there is an operating lever. I also provide a cutting head of four or other suitable number of sections forming, as it were, a circular disc, two or other number of the sections carrying the cutters while the other sections carry steadying arms. The periphery of the cutting head has a groove or recess formed therein into which a gear chain or such like rides, the ends of which are connected with the operating lever. Suitably fixed to the inside face of the cutting head there is a series of slides and on the inside face of the back plate there is a series of corresponding slides, the former engaging with the latter, thus connecting the cutting head with the plate. Suitable spiral or other springs are provided between the cutting head and the plate and suitably fixed to the back plate there is a hollow spindle.

In order that my invention may be properly understood and readily carried into effect, I have hereunto appended two sheets of drawings, of which:—

Figure 3 is an end view of Figure 1 with the vise removed.

Figure 4 is a sectional elevation through the cutting head of a modification of the means of operating the mechanism.

Figure 5 is an end view of Figure 4.

Figure 1:
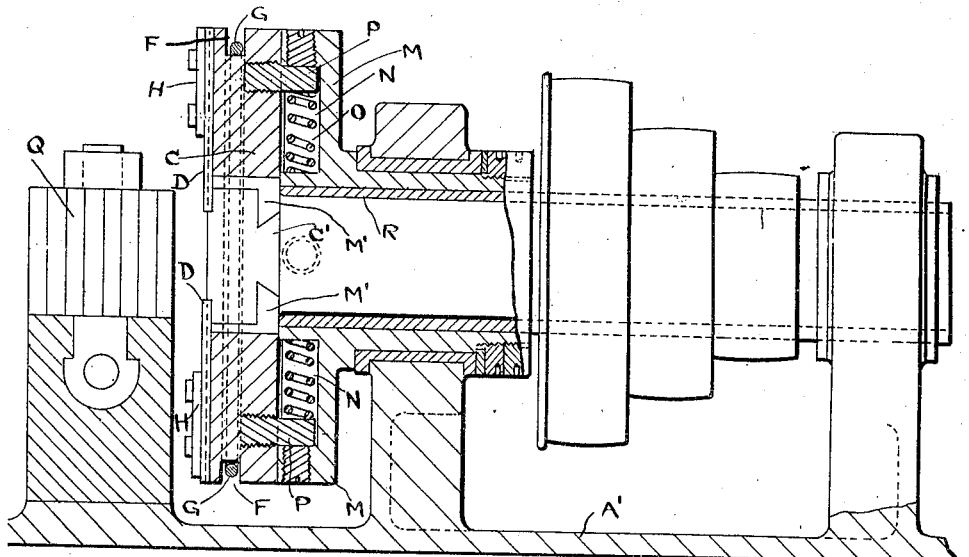
Figure 1 is a sectional elevation illustrating my invention.
Figure 2:
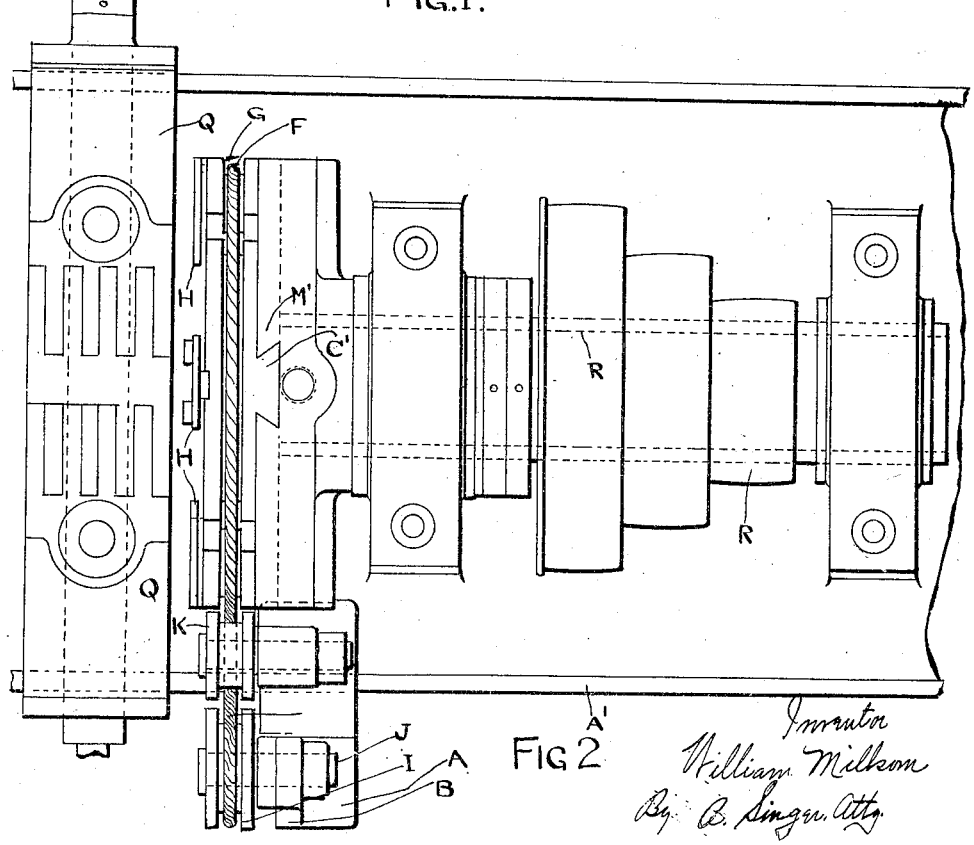
Figure 2 is a plan of Figure 1.

Referring to the drawings, A is the bracket fixed to the table A' of the machine. B is the operating handle which is pivoted at B' to the bracket A, and C is the cutting head which, as shown, is in four sections, and E the steadying arms. The cutters D and steadying arms E are held in position by the clamps H fixed to the cutting head C. F is the groove or recess in the periphery of the cutting head C and G is the gear-chain or rope which runs in the groove or recess F, the ends of the rope or chain G being connected with the operating lever B.

Pivotally mounted in a grooved pulley I is a pin J which is fixed to the operating lever B. Two grooved jockey or guide pulleys K are suitably fixed to the bracket A between which pulleys the chain or rope G passes in order to ensure the rope or chain G having a greater bearing surface in the groove or recess F in the segments forming the cutting head C. C' are the slides fixed to the inside face of the cutting head C, and on the driving head M which is suitably fixed to the hollow spindle R there is a series of corresponding slides M', the slides C' engaging with the slides M', thereby connecting the cutting head C with the driving head M, these slides C' and M' running radially from the central axis of the cutting head C. N are the springs which are in a recess O in the driving head M, the outside ends of the springs N bearing against a pin P which is fixed to the cutting head C.

The modus operandi is as follows:—

The tube to be cut is held in the vise Q and placed in the cutting head C and the lever B is operated to bring the cutters D into close contact with the tube and the apparatus is set into motion through any suitable gearing and power.

When the tube has been cut and removed, the lever B is released whereupon the cutting head C, by means of the springs N bearing on the pin P, is forced back into its normal position.

The cutters are capable of adjustment.

Referring to Figures 4 and 5, instead of the cable G passing round the circumference of the cutting head C, I may attach the cable G to the cutting head C on the segments that carry the cutters D, see Figure 4. In this case, one end of the cable G is suitably attached to the inner circumference of the cutting head C and led round a small pulley X suitably fixed in the hollow spindle R and then along a groove R' provided in the inside diameter of the hollow spindle R, the other end of the cable G being connected to a block W. This block W is positioned in a slot R² on the hollow spindle R and is prevented from getting out of position in this slot R² by being bolted to a ring U carried on the outside diameter of the hollow spindle R, by the bolts V. This ring U is able to slide along the hollow spindle R and is controlled in this movement by another ring S on which an operating lever T is suitably connected.

When my apparatus is applied to a lathe or other such machine, it can be adjusted to adapt itself to such and in this case the spindle is not required.

I might also provide a detachable solid die fitting into the back of plate behind the cutting head and internally threaded so that, should the end of the tube cut require to be screw-threaded, this can be readily done In such case the grips would be movable so that they would follow the pipe as it was travelling inwards in the process of being threaded.

Claims:

1. Cutting off mechanism of the class described, comprising a member mounted for rotation, cutter head members mounted on the first named member for movement toward and from the center thereof, certain of said cutter head members having cutters to engage the work and others having steadying arms to bear on the work, and springs to move said cutter head members outwardly, in combination with a cord connected to said cutter head members and means to exert tension on said cord to cause said cutter head members to move inwardly and thereby engage and cut the work.

2. Cutting off mechanism of the class described, comprising a member mounted for rotation, cutter head members mounted on the first named member for movement toward and from the center thereof, certain of said cutter head members having cutters to engage the work and others having steadying arms to bear on the work, and springs to move said cutter head members outwardly, in combination with a lever, and an endless cord connected to said lever and arranged in engagement with the peripheral portions of said cutter head members.

3. Cutting off mechanism of the class described, comprising a member mounted for rotation, cutter head members mounted on the first named member for movement toward and from the center thereof, certain of said cutter head members having cutters to engage the work and others having steadying arms to bear on the work, and springs to move said cutter head members outwardly, in combination with a lever, and an endless cord connected to said lever and arranged in engagement with the peripheral portions of said cutter head members, said cutter head members having grooves in their peripheral portions engaged by said endless cord.

4. Cutting off mechanism of the class described, comprising a member mounted for rotation, cutter head members mounted on the first named member for movement toward and from the center thereof, certain of said cutter head members having cutters to engage the work and others having steadying arms to bear on the work, and springs to move said cutter head members outwardly, in combination with a lever, and an endless cord connected to said lever and arranged in engagement with the peripheral portions of said cutter head members, and jockey pulleys bearing on the leads of said cord at a point between the cutter head and the lever.

In witness whereof I affix my signature.

WILLIAM MILLSOM.